US012699535B2

(12) United States Patent
Chintaluru

(10) Patent No.: US 12,699,535 B2
(45) Date of Patent: Aug. 4, 2026

(54) SOCIAL MEDIA CONTENT CREATOR

(71) Applicant: Microsoft Technology Licensing, LLC, Redmond, WA (US)

(72) Inventor: Shiva Chintaluru, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 18/205,935

(22) Filed: Jun. 5, 2023

(65) Prior Publication Data

US 2024/0403974 A1 Dec. 5, 2024

(51) Int. Cl.
*G06Q 10/40* (2026.01)
*G06F 3/04842* (2022.01)
*G06F 3/14* (2006.01)
*G10L 13/02* (2013.01)

(52) U.S. Cl.
CPC ......... *G06Q 10/40* (2026.01); *G06F 3/04842* (2013.01); *G06F 3/14* (2013.01); *G10L 13/02* (2013.01)

(58) Field of Classification Search
CPC ....... G06Q 50/01; G06F 3/04842; G06F 3/14; G10L 13/02; G10L 13/00
See application file for complete search history.

(56) References Cited

U.S. PATENT DOCUMENTS

| | | | |
|---|---|---|---|
| 9,451,122 B2 | 9/2016 | De Rosa et al. | |
| 10,684,738 B1 * | 6/2020 | Sicora .................. | G06F 3/0485 |
| 11,038,974 B1 * | 6/2021 | Koukoumidis ....... | G06F 40/274 |
| 11,797,780 B1 * | 10/2023 | Finegan ................. | G06F 40/40 |

(Continued)

FOREIGN PATENT DOCUMENTS

| | | | |
|---|---|---|---|
| CN | 112241874 A | 1/2021 | |
| WO | WO-2015044947 A1 * | 4/2015 | ............. G06V 20/00 |

(Continued)

OTHER PUBLICATIONS

Tao Hu, Chao Liang, Geyong Min, Keqin Li, Chunxia Xiao. Generating video animation from single still image in social media based on intelligent computing. 2020. Journal of Visual Communication and Image Representation. vol. 71. (Year: 2020).*

(Continued)

*Primary Examiner* — Sarah M Monfeldt
*Assistant Examiner* — Karma A El-Chanti
(74) *Attorney, Agent, or Firm* — Schwegman Lundberg & Woessner, P.A.

(57) ABSTRACT

Systems and methods are directed to generating a social media post. The system receives, via a post generation user interface (UI) implemented by a post generation component executing on a mobile device, an indication to generate a post on a topic for a networking platform. The system obtains, from a generative artificial intelligence system, text for the post based on the topic and the networking platform. A plurality of images are displayed and a selection of one or more images of the plurality of images is received. Using the selected one or more images, the system generates a video by applying transition effects to the selected one or more images. A preview of the post including the video on the post generation UI is presented on the mobile device. In response to an indication to share the post, the system publishes the post to the networking platform.

17 Claims, 11 Drawing Sheets

(56) References Cited

U.S. PATENT DOCUMENTS

| | | | | |
|---|---|---|---|---|
| 12,039,653 | B1 * | 7/2024 | Raya | G06F 40/40 |
| 2015/0134655 | A1 * | 5/2015 | Gamaley | G06F 16/9535 |
| | | | | 707/734 |
| 2015/0347578 | A1 * | 12/2015 | Tsai | G06Q 30/02 |
| | | | | 715/205 |
| 2017/0125058 | A1 * | 5/2017 | Shearman | G11B 27/031 |
| 2019/0355391 | A1 * | 11/2019 | Zavesky | G11B 27/031 |
| 2020/0320582 | A1 | 10/2020 | Hollis | |
| 2021/0126883 | A1 * | 4/2021 | Choi | G06F 3/0484 |
| 2022/0033077 | A1 * | 2/2022 | Myslinski | G05D 1/0088 |
| 2022/0068296 | A1 * | 3/2022 | Wilson | G06T 13/205 |
| 2022/0108727 | A1 * | 4/2022 | van Welzen | G11B 27/031 |
| 2022/0215606 | A1 * | 7/2022 | Radford | G06F 16/9577 |
| 2023/0044447 | A1 | 2/2023 | Beaulieu | |
| 2023/0111911 | A1 * | 4/2023 | Druck | G06Q 30/0282 |
| | | | | 715/234 |
| 2023/0274299 | A1 * | 8/2023 | Dalal | G06Q 50/01 |
| | | | | 705/14.66 |
| 2023/0386116 | A1 * | 11/2023 | Ding | G10L 13/02 |
| 2024/0005084 | A1 * | 1/2024 | Zalmanson | G06F 40/216 |
| 2024/0112041 | A1 * | 4/2024 | Bambha | H04N 21/4826 |
| 2024/0256791 | A1 * | 8/2024 | Santhanam | G06F 40/284 |
| 2024/0282016 | A1 * | 8/2024 | Liu | G06V 40/161 |

FOREIGN PATENT DOCUMENTS

| | | | | |
|---|---|---|---|---|
| WO | WO-2021244457 A1 * | 12/2021 | | G06F 18/214 |
| WO | WO-2022190079 A1 * | 9/2022 | | G06F 16/90332 |

OTHER PUBLICATIONS

"Jasper", Retrieved From: https://www.jasper.ai/, Retrieved From: Feb. 17, 2023, 5 Pages.

"Writesonic for marketing team", Retrieved From: https://writesonic.com/#Marketing-team, Retrieved From: Feb. 17, 2023, 12 Pages.

Millen, Jacobm. , "Copy.ai tool for social media", Retrieved From: https://www.copy.ai/social-media-managers, Retrieved From: Feb. 17, 2023, 6 Pages.

Muller, et al., "GenAICHI: Generative AI and HCI", In Proceedings of CHI Conference on Human Factors in Computing Systems Extended Abstracts, Apr. 28, 2022, 7 Pages.

Oppenlaender, Jonas, "A Taxonomy of Prompt Modifiers for Text-To-Image Generation", In repository of arXiv:2204.13988v2, Jul. 31, 2022, 15 Pages.

Wiggers, Kyle, "QuickVid uses AI to generate short-form videos, complete with voiceovers", Retrieved From: https://techcrunch.com/2022/12/30/quickvid-uses-ai-to-generate-short-form-videos-complete-with-voiceovers/, Dec. 31, 2022, 11 Pages.

* cited by examiner

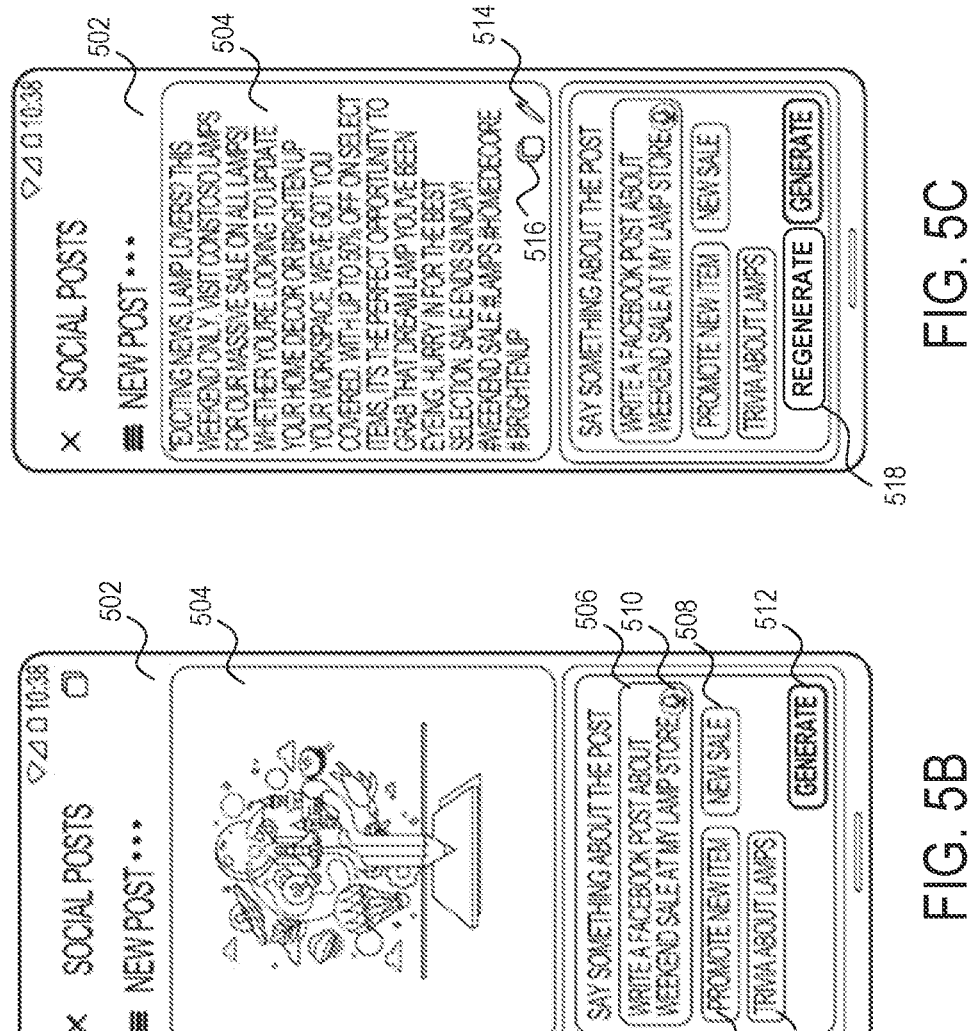
FIG. 5C
FIG. 5B
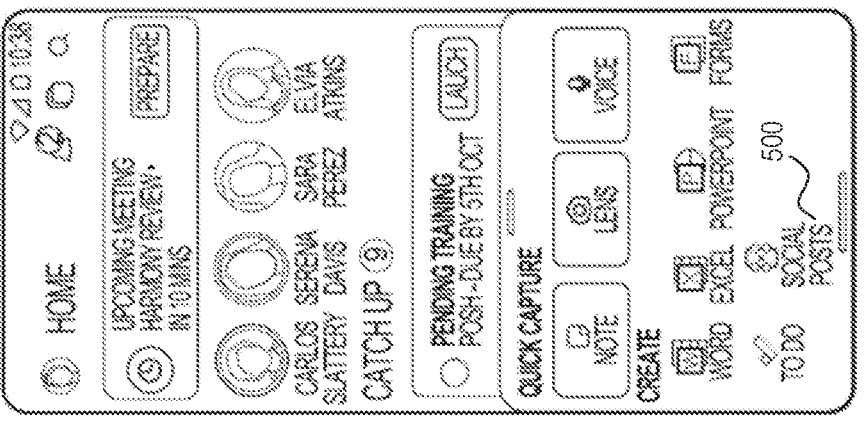
FIG. 5A

SOCIAL MEDIA CONTENT CREATOR

TECHNICAL FIELD

The subject matter disclosed herein generally relates to machine content creation. Specifically, the present disclosure addresses systems and methods that machine generates content for posting on a plurality of different social media platforms.

BACKGROUND

Posting content on social media platforms can be a convenient and efficient way to bring interest to a subject matter of a posting user. In the context of a small business or an influencer, social media posts can be useful "marketing" to drive interest to their content or site. However, these entities may not know how to efficiently create engaging posts with fresh content, thus resulting in obtaining less views.

BRIEF DESCRIPTION OF THE DRAWINGS

Some embodiments are illustrated by way of example and not limitation in the figures of the accompanying drawings.

FIG. 5A-FIG. 5E are example screenshots illustrating user interfaces presented on the client device for generating social media posts, according to some example embodiments.

DETAILED DESCRIPTION

Figure 1:
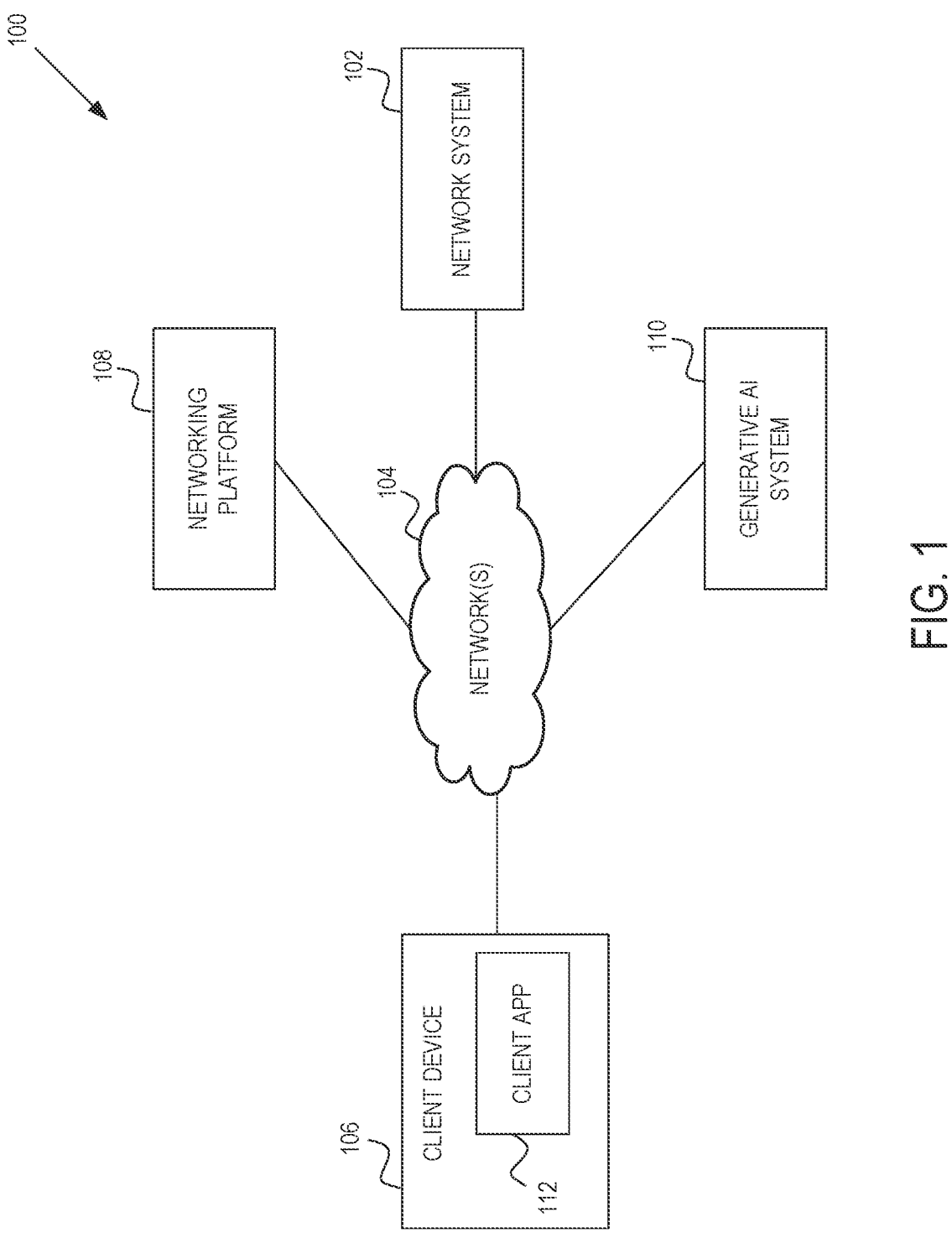
FIG. 1 is a diagram illustrating a network environment suitable for social media content creation, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Example embodiments provide a network system that machine-generates social media posts (also referred to herein as "media posts" or just "posts") that are customized to particular networking platforms for a particular topic selected by the user. Each networking platform has their own particular format and/or style. For example, a Facebook or Instagram post can include more content and hashtags, while a Twitter post should be short and to the point. Additionally, each networking platform may have different requirements for images and videos that are included in the posts. Thus, the network system has knowledge of different posting requirements of each networking platform.

Textual content generated for a social media post should be engaging and relevant. As such, the network system works with a generative artificial intelligence (AI) system to generate the textual content for each post. In some cases, the generative AI system is embodied within the network system. In other embodiments, the generative AI system is external to the network system and is queried using an application programming interface (API) call. An example of a generative AI system is ChatGPT.

In some embodiments, an interface used by a user to trigger the generation of the social media post is provided by a post generation component of a client application operating on a client device of the user. In some cases, the client device is a mobile device. The post generation component is configured to exchange data with the network system in order to generate the posts. For example, the client device can be a smartphone having a gallery of captured images or video. These captured images or videos can be accessed, via the post generation component, and incorporated into the post. Alternatively, some of the images or videos can be captured live for inclusion in a post that is currently being generated.

In some cases, the images or videos are generated by the network system. For images, the network system has access to one or more libraries of images. These images can be used as is or used as a basis for generating a new image. As an example, two images can be combined to generate a new image that corresponds to the topic, or an image can be modified (e.g., add text or imagery on top, add borders, change colors) to correspond better to the topic. For videos, the network system can randomly apply transition effects (e.g., zoom in/out, morph in/out, fade in/out) to the images to transition from one image to another. Alternatively, the network system accesses a database of video templates that are customized to user preferences, number of images selected for the video, and/or each networking platform. Each video template provides instructions for generating the video including an amount of time to display each image and a transition effect to apply to each image transition.

As a result, example embodiments provide a technical solution that machine generates social media posts that are highly engaging and relevant, and which are correctly formatted for their respective networking platform. The technical solution includes obtaining text generated by a generative AI system directed to a topic selected by a user. Corresponding images are accessed or generated and subsequently displayed to the user for selection. Based on the selection, a video is generated by applying transition effects to the selected images and the video presented as part of a preview of the post. Upon approval and an indication to share the post, the network system causes the post to be published to the networking platform. Thus, using example embodiments, engaging and relevant machine-generated social media posts are quickly and efficiently generated via a simple user interface presented on the client device.

FIG. 1 is a diagram illustrating a network environment 100 suitable for social media content creation, in accordance with example embodiments. A network system 102 is communicatively coupled, via a network 104, to a client device 106. In some embodiments, the network system 102 is associated with a single entity (e.g., software provider) and/or can comprise a subscriber system such as, for example, Microsoft 365. The network system 102 is configured to generate media posts for posting on one or more networking platforms 108. In some embodiments, the network system 102 makes application programming interface (API) calls to an external generative artificial intelligence (AI) system 110 (e.g., a language model) to obtain generated content that is used in generating the social media post. In other embodiments, the generative AI system 110 is embodied within the network system 102. The network system 102 will be discussed in more detail in connection with FIG. 2 below.

In example embodiments, the generative AI system 110 comprises one or more generative models trained on patterns and structures of training data and subsequently generate new content that is similar to the training data with some novelty. That is the generative AI system 110 can generate new content for the topic based on existing patterns and data that it has been trained on.

In various embodiments, the generative AI system 110 is configured to receive a query and generate content based on the query. For example, the query can include a subject matter of the social media post and where the post will be published, and the generated content comprises text for the social media post based on the subject matter and the networking platform 108. Because each networking platform 108 has different posting requirements, the generative AI system 110 is aware of these nuances and may generate different content for different networking platforms 108. The generated content is then provided to components of the network system 102 which use the generated content to create the social media post, as will be discussed in more detail below.

The networking platform 108 can comprise a social networking platform. The networking platform 108 can be associate with the network system 102 (e.g., under the same ownership) or may be a third-party networking platform 108. Each networking platform 108 provides a network where user can post or publish content that garner views from other users of the networking platform 108. Examples of networking platforms 108 include, but are not limited to, LinkedIn, Facebook, Twitter, WhatsApp, and Instagram.

The client device 106 is a device of a user of the network system 102 that wants to create social media posts. The client device 106 may comprise, but is not limited to, a smartphone, tablet, laptop, multi-processor systems, microprocessor-based or programmable consumer electronics, game consoles, a server, or any other communication device that can perform operations with respect to the network system 102 via the network 104. The operations can include, for example, capturing images and videos, viewing and editing previews of social media posts generated by the network system 102, and scheduling the publication of social media posts. For purposes of illustration, example embodiments will be discussed whereby the client device 106 is a mobile device (e.g., a smartphone).

In example embodiments, the client device 106 comprises one or more client applications 112 that communicate with the network system 102 for added functionality. For example, the client application 112 may be a local version of an application or component of the network system 102. Alternatively, the client application 112 exchanges data with one or more corresponding components/applications at the network system 102. For instance, the client application 112 can be a mobile productivity application (e.g., Microsoft 365 application) and the corresponding application at the network system 102 is Microsoft 365. The client application 112 may be provided by the network system 102 and/or downloaded to the client device 106.

In one embodiment, the application 112 comprises a post generation component (e.g., a component of the mobile productivity application). Activation of the post generation component causes a post generation user interface (UI) to be displayed on the client device 106 and an indication of the activation to be sent to the network system 102. A user of the client device 106 can provide an indication of a topic, via the post generation UI, which is transmitted to the network system 102. In response, sample generated content for the social media post is returned. Further exchange of communications between the post generation component (via the post generation UI) and the network system 102 can result in addition of one or more images, addition of a video, edits to the generated content, and/or posting of the social media post to one or more networking platforms 108, as will be discussed in more detail below. While the post generation component is described as being a part of the mobile productivity application, alternatively, the post generation component can be a standalone application.

Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. Accordingly, a variety of different configurations are expressly contemplated.

In example embodiments, any of the systems, devices, or platforms (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
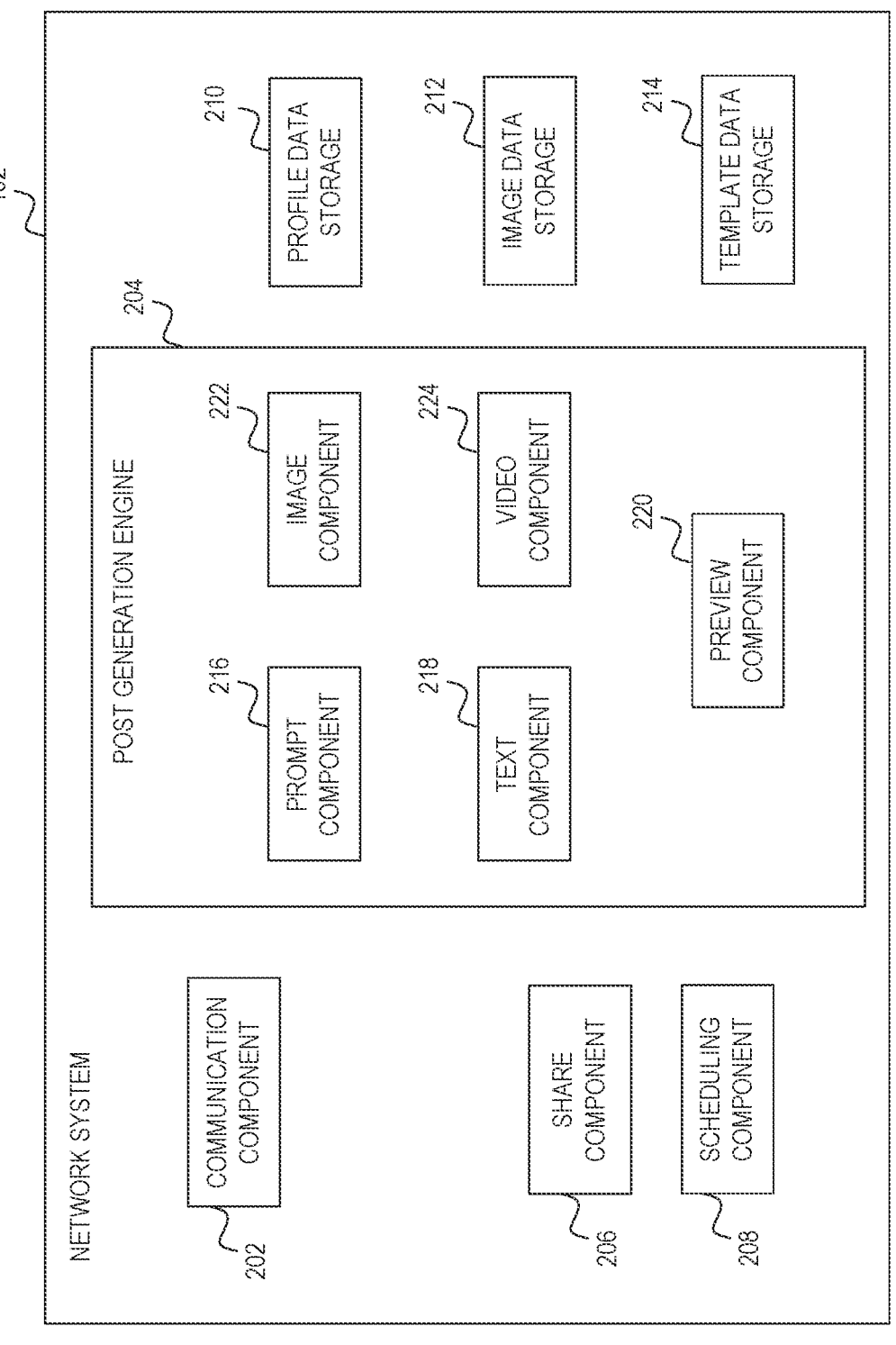
FIG. 2 is a diagram illustrating components of a network system for creating social media posts, according to some example embodiments.

Moreover, any of the components illustrated in FIG. 1 or their functions may be combined, or the functions described herein for any single component may be subdivided among multiple components. Additionally, any number of client devices 106 may be embodied within the network environment 100. While only a single network system 102, networking platform 108, and generative AI system 110 are shown, alternative embodiments contemplate having more than one network system 102 (e.g., each localized to a particular region), networking platforms 108, and/or generative AI systems 110 to perform the operations discussed herein FIG. 2 is a diagram illustrating components of the network system 102 configured to create social media posts, according to some example embodiments. In example embodiments, the network system 102 provides topic prompts, manages image and video access and/or generation, generates videos, and generates and provides previews of social media posts. The network system 102 further causes the posts to be published to the networking platform 108. To enable these operations, the network system 102 comprises a communication component 202, a post generation engine 204, a share component 206, and a scheduling component 208, all communicatively couple to each other. The network system 102 also comprises or has access to a plurality of data storage including a profile data storage 210, an image data storage 212, and a template data storage 214. In some cases, the data storage 210, 212, and/or 214 may be located external to the network system 102 but be communicatively accessible.

The communication component 202 is configured to exchange data with the various components of the networking environment 100. Accordingly, the communication component 202 receives an indication of activation of a post generation component at the client device 106. The communication component 202 also receives a topic of a post to be generated and may access images or videos stored on the client device 106 that are to be included in the post. The topic may include the subject matter of the post and/or what networking platform 108 the post will be published to.

In response, the communication component 202 provides various data to the client device 106. In some cases, the communication component 202 transmits topic prompts to the client device 106. The topic prompts provides suggestions for a topic on which the user may want to generate a post. The communication component 202 also transmits or causes display of previews of the posts generated by the network system 102.

The post generation engine 204 is configured to generate the social media posts. In order to generate posts, the post generation engine 204 may provide prompts, receive topics, obtain generated textual content, generate and/or incorporate images and videos, and provide previews of the posts. To provide these operations, the post generation engine 204 comprises a prompt component 216, a text component 218, a preview component 220, an image component 222, and a video component 224.

The prompt component 216 is configured to generate custom prompts that provide suggestions for a topic on which the user may want to generate a post. In example embodiments, the prompt component 216 is triggered to generate the custom prompts upon an indication of activation of a post generation component of the client application 112 executing on the mobile device (e.g., client device 106) of a user. In some cases, the prompt component 216 accesses a profile data storage 210 to identify subject matter of relevance for the user. The profile data for the user may indicate a business, organization, hobbies, activities, or other preferences associated with the user. The profile data may also indicate which networking platform 108 the user typically posts to (e.g., a count of posts made to each networking platform 108), has an account with, or has indicated a preference for. Using the profile data, the prompt component 216 identifies relevant subject matter for the user and, in some embodiments, may rank these subject matters. For instance, the relevant subject matters can be derived based on the business, organization, hobbies, and/or activities indicated in the profile data. These subject matters can then be ranked, for example, based on an amount of past posts associated with the subject matters or an indicated posting preference of the user. The top subject matter(s) is then selected to generate the prompts from.

The generated custom prompts can also be ranked for presentation to the user. This ranking may be based on, for example, past selection of similar custom prompts and/or a corresponding relevance score. Further still, after a custom prompt is selected, a new custom prompt can be provided in its place. The new custom prompt may be a next ranked prompt generated by the prompt component 216.

As such, the generation of custom prompts involves in-depth understanding by the prompt component 216 of the user profile, specific business or content creation type, an analysis of past posts, as well as considering regional context and special events. In one embodiment, the prompt component 216 categorizes users based on their profile data into different types such as small business owners, influencers, and so forth. This broad classification forms a foundation for understanding the user's specific needs and interests. Next, the prompt component 216 gathers additional information that provides insight into a user's business type or a kind of content the user produces. This data deepens the prompt component's 216 understanding of the user's niche, thereby allowing the prompt component 216 to create more tailored prompts. Finally, the prompt component 216 evaluates the user's past posts to discern topics that pique the user's interest. This analysis ensures that generated prompts align with subject matter the user has previously shown engagement with. Additionally, the prompt component 216 can factors in a user's regional context and any special events or dates. For instance, if the user is based in the United States and it is July 4th, the prompt component 216 can include suggestions relevant to this occasion.

Each generated custom prompt is assigned a relevance score by the prompt component 216. The relevance score is determined by each prompt's alignment with the user's profile, historical engagement data, regional context, and special events. The prompts are subsequently ranked according to this relevance score, ensuring presentation of the most appropriate, personalized, and timely prompts to the user.

As an example, the user may be an owner of a lighting store who has an account with Facebook and/or posts to Facebook often. With that knowledge, the prompt component 216 may generate and provide custom prompts directed to topics related to the user's business such as posting on a new lamp product, posting on an upcoming sale, and/or posting on other lamp related subjects on Facebook. Alternatively, the prompt component 216 can provide custom prompts directed to topics relate to the user's hobbies or activities (e.g., travel, sports). In some cases, the custom prompts are generated and provided as soon as the post generation component is activated. Additionally, custom prompts can be provided or updated based on receiving a selected topic (or selection of a previously displayed custom prompt) which allows the user to further refine on (e.g., get specific about) the topic of the post. For example, if the user provides a topic of "lampshade," the custom prompts may be updated to suggest promoting an item with a lampshade or provide a trivia question regarding lampshades.

The text component 218 is configured to generate a text portion of the post. In various embodiments, the text component 218 receives, via the communication component 202, a topic on which to generate the post. Given the topic and the profile data of the user, the text component 218 generates the text portion of the post. In some embodiments, the text component 218 formulates a query and makes a call (e.g., an application program interface (API) call) to the generative AI system 110. The query may indicate the subject matter of the post, what networking platform 108 the post will be published to, and any preferences of the user. For instance, the user preference can include, for example, a language and whether the post is public or private. The text component 218 then receives, in response, generated content from the generative AI system 110. In an alternative embodiment, the text component 218 comprises the generative AI system 110, and the text component 218 generates the content based on the topic.

The preview component 220 is configured to provide a preview of the post. For instance, the generated content from the text component 218 is presented on the post generation user interface (UI) by the preview component 220. Additionally, selected or generated images and/or videos can be shown incorporated in the preview of the post. The preview component 220 formats the post for the particular networking platform 108 that the post will be published on. For instance, size of images or the post, itself, may differ for different networking platforms 108. As another example, some networking platforms 108 allow for hashtags, images, and/or videos to be included in a post, while others may not. The preview is presented on the post generation UI for user review and approval.

In some cases, the user may not like the generated text content. If there are minor changes desired by the user, the user can edit the text content directly on the post generation UI. Alternatively, if the user does not like a large portion of the text content, the user can select a regenerate option or icon that is displayed on the preview of the post. The selection of the regenerate icon triggers the text component 218 to generate a new text portion of the post.

The image component 222 is configured to manage inclusion of one or more images to a social media post. In some cases, the image component 222 accesses images stored on the client device 106. For instance, the image component 222 can cause an image prompt to be displayed on the post generation UI instructing the user to upload relevant images captured and stored on the client device 106 or to take a live photo. Alternatively, the image prompt may cause the post generation component to access images stored on the client device 102 that may be relevant to the post (e.g., search an image gallery on the client device 102 based on keyword(s) associated with the topic) and display these images on the post generation UI for selection. Further still, the image prompt may trigger the post generation application to automatically activate a camera application (or a camera functionality associated with the post generation component) so that the user can capture a relevant image. The image component 222 can also access and suggest use of images from a stock library (e.g., the image data storage 212). These stock images can be presented on the post generation UI for user selection.

The image component 222 is also configured to generate images for posts. In some embodiments, the image component 222 accesses the image data storage 212 (e.g., image library) to retrieve one or more images. In some cases, the images can be altered by the image component 222. For instance, the image component 222 (e.g., an image generation application) can combine two images to create a new image that is related to the topic of the post. As an example, the post may be a holiday greeting from the user's lamp store. The image component 222 can access an image of a holiday tree and an image of a lamp and combine the two images such that the lamp is pictured under the tree. The image component 222 can also modify an image by changing, adding, or removing content on the image. For example, text and images can be added or removed, a decorative border added, and/or a color of an object changed. Further still, the image component 222 can request the generative AI system 110 to generate a relevant image. In these cases, the image component 222 can work with the text component 218 to send a single query for both the generated text and the relevant image. Alternatively, the image component 222 can send a separate call to the generative AI system 110. In a further embodiment, the image component 222 may comprise the image generating generative AI system. The generated image(s) then can be presented on the post generation UI for user selection.

Once the user selects one or more of the images, the image component 222 provides the image(s) to the preview component 220. The preview component 220 then formats the image(s) to the requirements of the networking platform 108 (e.g., size, shape, pixel requirements) and presents a preview of the post with the generated text content and the image(s).

The video component 224 is configured to manage inclusion of one or more videos on a post. In some embodiments, the video component 224 accesses a video stored on the client device 106. For instance, the video component 224 can cause a video prompt to be displayed on the post generation UI instructing the user to select and upload a video captured and stored on the client device 106 or to capture a live video. Alternatively, the video prompt may cause the post generation component to access videos stored on the client device 102 that may be relevant to the post (e.g, perform a keyword search for relevant videos) and display a thumbnail of the relevant video(s) on the post generation UI for selection. Further still, the video prompt may trigger the post generation component to automatically activate a camera application (or a camera functionality associated with the post generation application) so that the user can capture a live video.

In further embodiments, the video component 224 generates a video using images selected by the user. In these embodiments, the video component 224 works with the image component 222 to obtain images selected by the user for inclusion in the video. In some cases, the video component 224 applies random transitions (e.g., zoom in, zoom out, fade in, fade out) between the images. The transitions may be randomly applied based on the length of the video and the number of images. The length may be determined or set (e.g., default) by the user, the network system 102, or the networking platform 108. For example, if there are three selected images for a nine second video, the video component 224 may show each image for roughly three seconds and randomly apply a zoom transition followed by a fade in transition.

In other embodiments, the video component 224 retrieves a video template from the template data storage 214. The video template defines types of transitions to apply and for how long each image should be displayed before a transition occurs. The video template can be selected based on, for example, the networking platform 108 that will display the post, a number of selected images, or preferences/defaults set by the user. Thus, different video templates may be established for different networking platforms 108. Additionally, the user can create templates by indicating, to the video component 224, what transitions they like or for how long they prefer images to be displayed for different networking platforms 108.

In some embodiments, the video includes an artificial intelligence (AI) generated voice-over. The voice-over can present the generated text or the voice-over can present additional information beyond the generated text. Speech reciting the additional information or the generated text is generated by the video component 224 and then incorporated as a voice-over into the video. The additional information may be generated by, for example, the text component 218 or the generative AI system 110. For instance, the additional information may be a summarization of the generated text or provide more details than the generated text (e.g., provide a detailed description of an item in the image that is being displayed).

Once the video component 224 obtains or generates the video to be included in the post, the video component 224 provides the video to the preview component 220. The preview component 220 then formats the video to the requirements of the networking platform 108 (e.g., size requirements) and presents a preview of the post with the generated text content and the video. Depending on the networking platform 108, the post can include both image(s) and video(s) along with the text content.

The share component 206 manages the publication of the generated post to one or more of the networking platforms 108. In example embodiments, the preview component 220 displays, via the post generation UI, a share option or icon. Should the user approve of the preview of the generated post, the user selects the share icon. The indication of this selection is received by the communication component 202 and transmitted to the share component 206. The share component 206 then publishes the post to the corresponding networking platform 208.

In some cases, the post may be scheduled to be published at a later time. In these embodiments, the scheduling component 208 manages the scheduling. In some cases, the user may already know when they would like to schedule the publication of the post. For example, the user may publish a post at a certain time on a certain day every week. As such, the user can select an option to schedule the post presented on the post generation UI and indicate the date and time.

In other cases, the scheduling component 208 provides suggestions of when to publish the post. In these cases, the scheduling component 208 uses machine intelligence to determine when the most views are likely to be received and presents those times as suggestions. Each networking platform 108 may have one or more ideal times when posts (or certain types of posts) will garner the most views. In some embodiments, these times can be initially hardcoded and subsequently machine learned by the scheduling component 208. For instance, the scheduling component 208 may monitoring the number of views each posting generated by the network system 102 garners over a period of time on each networking platform 108. The scheduling component 208 then analyzes the monitored information to determine the ideal publication times for each networking platform 108 and/or post type (e.g., personal, marketing, small business, influencer). The scheduling component 208 may periodically retrain on new data to update the ideal times. The ideal times may be stored and later accessed by the scheduling component 208 when time suggestions are needed. The user than simply selects a time suggestion to schedule the posting.

Figure 3A:
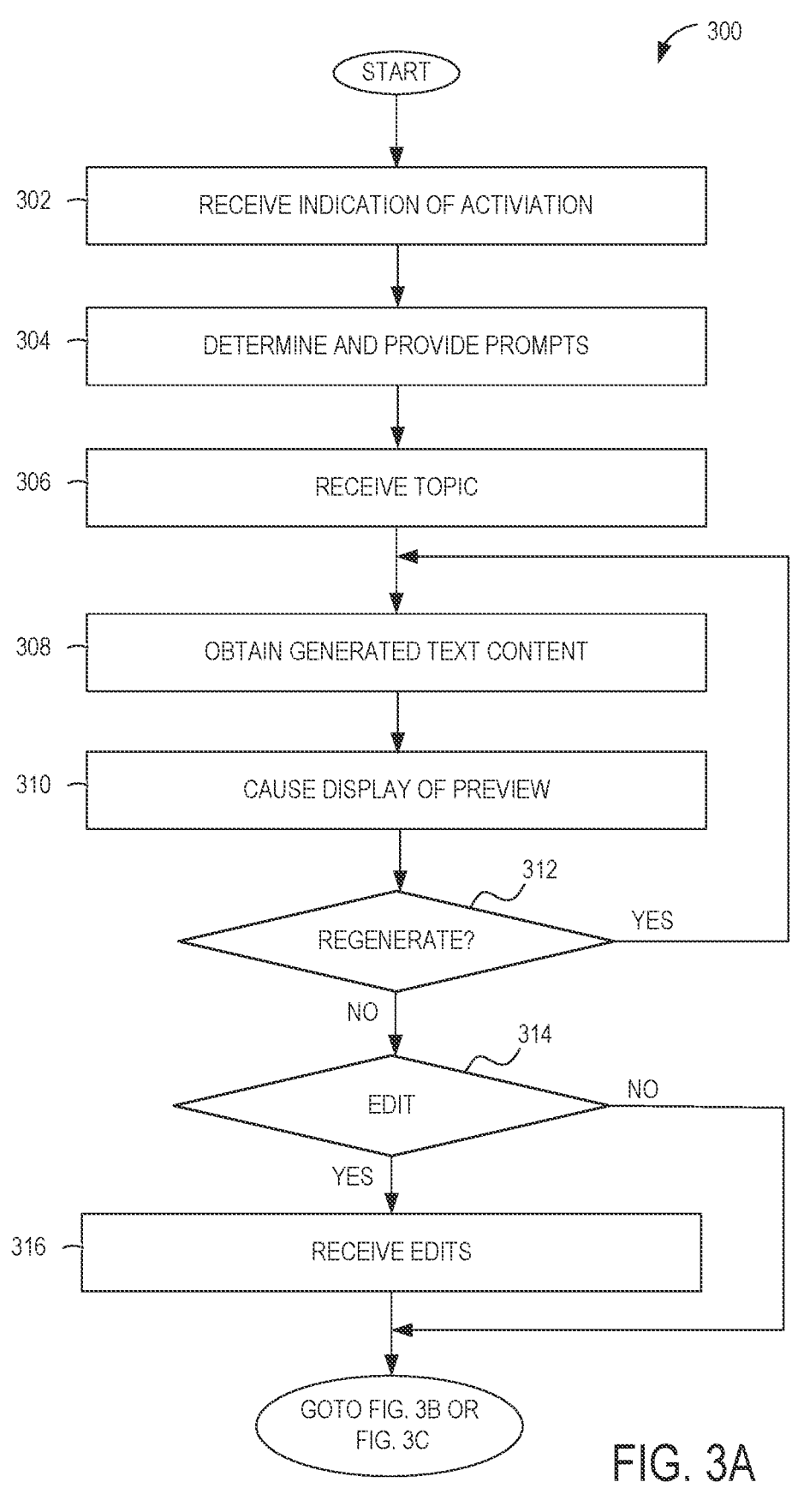
FIG. 3A-FIG. 3C are flowcharts illustrating operations of a method for generating social media posts performed by the network system, according to some example embodiments.
Figure 3B:
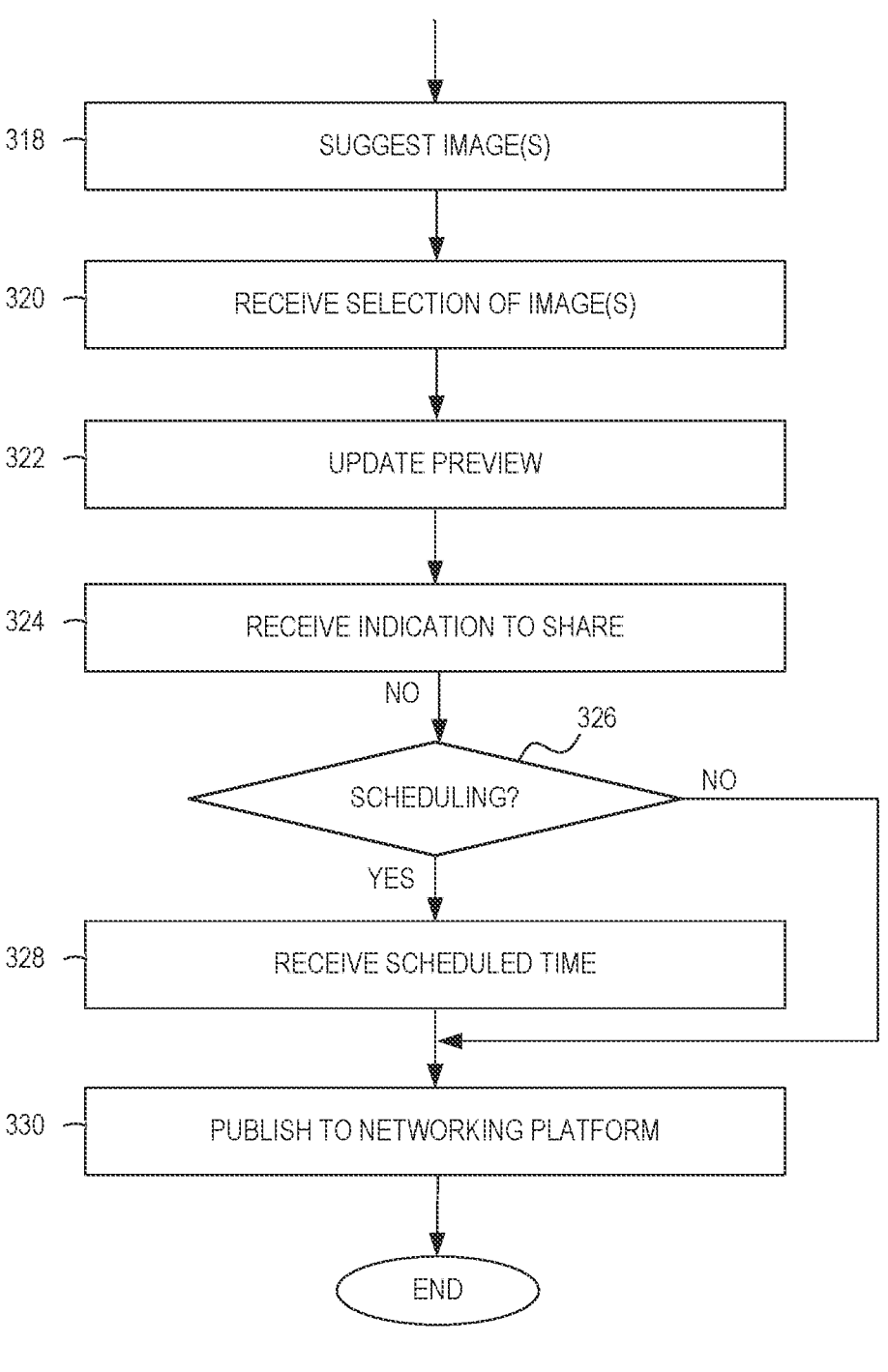
Figure 3C:
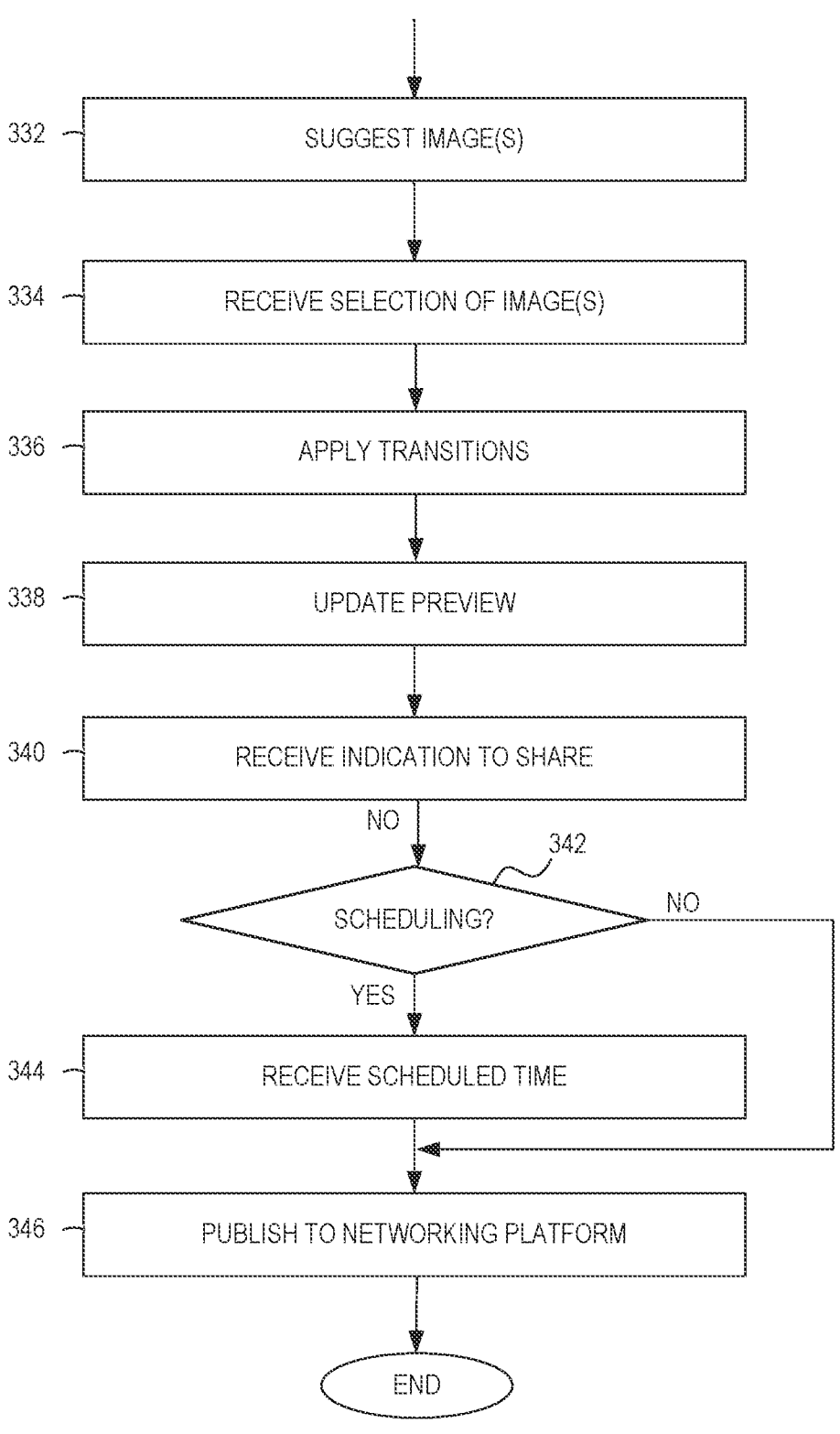

FIG. 3A-FIG. 3C are flowcharts illustrating operations, performed by the network system 102, of a method 300 for a generating social media post, according to some example embodiments. Operations in the method 300 may be performed by the network system 102 in the network environment 100 described above with respect to FIG. 2. Accordingly, the method 300 is described by way of example with reference to these components in the network system 102. However, it shall be appreciated that at least some of the operations of the method 300 may be deployed on various other hardware configurations or be performed by similar components residing elsewhere in the network environment 100. Therefore, the method 300 is not intended to be limited to these components.

In operation 302, the network system 102 receives an indication of activation of the post generation component at the client device 106. The indication is received by the communication component 202 which notifies the post generation engine 204.

In operation 304, the prompt component 216 determines and provides custom prompts for display on the post generation UI. The generating and providing of the custom prompt is triggered by the activation of the post generation component. By generating the custom prompts immediately upon activation of the post generation component, the custom prompts can be displayed right away on the post generation UI as suggestions (e.g., before the user even starts to provide any inputs). In some cases, the prompt component 216 accesses a profile data storage 210 to identify subject matter(s) of relevance for the user and any user preferences. The prompt component 216 then determines the custom prompts based on the subject matter(s) and user preferences. The custom prompts are generated and provided as soon as the post generation component is activated and can be refined based on receiving a topic (or selection of a previously displayed custom prompt) from the user.

In operation 306, the network system 102 receives a topic for the post. In example embodiments, the topic can be a selection of one or more custom prompts and/or a user input that is provided in the post generation UI. For example, the user may type the topic in a topic input section of the post generation UI or provide a verbal indication of the topic to the post generation UI. In some cases, the topic includes the networking platform 108 that the post will be published to. The communication component 202 provides the topic to the text component 218.

In operation 308, the text component 218 obtains the generated text content based on the topic and creates a text portion of the post. In some embodiments, the text component 218 may formulate a query indicating the topic, networking platform 108, and/or user preferences, and makes an API call to the generative AI system 110. The text component 218 then receives the generated text content from the generative AI system 110. In some embodiments, the text component 218 comprises the generative AI system 110, and the text component 218 generates the text content based on the topic. Different text content may be generated for different networking platforms 108. For example, if the post will be published on Twitter, then the text content may be short and to the point. In contrast, if the post is for Facebook or Instagram, the text content may be longer and include images.

In operation 310, the preview component 220 causes display of the preview of the text portion of the post. Accordingly, the generated content from the text component 218 is presented on the post generation user interface (UI) by the preview component 220.

In operation 312, the network system 102 determines whether a regenerate indication is received. In some cases, the user may not like the generated text content and want the text content regenerated. If the regenerate indication is received, then the method 300 returns to operation 308 where new generated text content is obtained. In some cases, the regenerate indication may include a refinement of the topic (e.g., a selection of a custom prompt, refined user input).

If no regenerate indication is received, the method continues to operation 314 where a determination is made whether the generated text content is edited. In example embodiments, the user can select an edit option displayed with the preview of the text content. The user can then directly edit the text content displayed on the post generation UI. These edits are received by the preview component 220 in operation 316 and used to update the text content.

If no edits are received, then the method 300 continues to either FIG. 3B or FIG. 3C. The operations of FIG. 3B involve the incorporation of one or more images into the post, while the operations of FIG. 3C involve the incorporation of one or more videos in the post. The determination of whether to incorporate an image or a video may be triggered by a selection of a corresponding option via the post generation UI. For example, the post generation UI may provide selectable icons to add image(s) or to add video(s) to the post. In some embodiments, both images and videos can be added to a post.

Referring now to FIG. 3B, in operation 318, the image component 222 suggests image(s) for inclusion in the post. For instance, the image component 222 can cause an image prompt to be displayed instructing the user to upload one or more relevant images to include in the post or to take a live photo. Alternatively, the image component 222 causes the post generation component to access images stored on the client device 102 that may be relevant to the post (e.g., search an image gallery on the client device 102) and display these images for selection by the user. Further still, the image component 222 may trigger the post generation application to automatically activate a camera application (or a camera functionality associated with the post generation component) so that the user can capture a relevant photo. The image component 222 can also suggest relevant stock images from the image data storage 212.

Additionally or alternatively, the image component 222 generates one or more images for the post. In some embodiments, the image component 222 accesses the image data storage 212 (e.g., image library) to retrieve one or more images. The images can be altered or modified by the image component 222 (e.g., combine images; change, add, or remove content on the image). In other embodiments, the image component 222 requests the generative AI system 110 to generate an image based on the topic or the generated text. Further still, the image component 222 can be an image generative AI system. The generated image(s) can then be displayed for selection by the user.

In operation 320, the image component 222 receives, via the communication component 202, selection of one or more images to include in the post. Thus, the image component 222 may receive captured image(s) from the client device 106 or receive a selection of one or more images displayed for selection on the post generation UI.

In operation 322, the preview component 220 updates the preview of the post to include the selected image(s). In some embodiments, the preview component 220 formats the image(s) to the requirements of the networking platform 108 (e.g., size, shape, pixel requirements) to which the post will be published. The image(s) are then incorporated with the generated text content and presented as a preview of the post on the post generation UI.

In operation 324, the share component 206 receives an indication to share the generated post. In example embodiments, the preview component 220 displays, via the post generation UI, a share icon or option. Upon user approval of the preview of the generated post, the user can select the share option. The indication of this selection is received by the communication component 202 and transmitted to the share component 206.

In operation 326, a determination is made whether the social media post is scheduled to be published at a later time. In some cases, the indication to share the post may trigger a request to be displayed on the post generation UI to confirm whether to immediate publish the post or to schedule the publication for a later time. In other cases, the post generation UI may display two share icons or options—one for immediate publication and one for scheduled publication.

If the social media post is to be published at a later time, then in operation 328, the scheduling component 208 receives an indication of the time. In some cases, the user may already know when they would like to schedule the publication of the post. In these cases, the user indicate the date and time. In other cases, the scheduling component 208 provides suggestions of when to publish the post based on machine intelligence that determines when the most views are likely to be received. These suggestions are provided to the user for selection.

In operation 330, the share component 206 publishes the post to the corresponding networking platform 208. The publication can be as soon as the user selects to share the post or based on the scheduled time.

Referring now to FIG. 3C, operations for generating a video and including the generated video in the social media post are provided. In the embodiment described in FIG. 3C, the video is generated by the network system 102 instead of merely receiving a video captured by the client device 106 for inclusion.

In operation 332, the image component 222 suggests image(s) for use in generating the video. For instance, the image component 222 can cause an image prompt to be displayed instructing the user to upload one or more relevant images to include in the video. Alternatively, the image component 222 causes the post generation component to access images stored on the client device 102 that may be relevant to the video (e.g., search an image gallery on the client device 102) and display these images for selection by the user. Further still, the image component 222 may trigger the post generation application to activate a camera application (or a camera functionality associated with the post generation component) so that the user can take capture a relevant photo. Additionally, the image component 222 can suggest relevant stock images from the image data storage 212, and/or generate (or obtain from an image generative AI system) one or more relevant images based on the topic or generated text.

In operation 334, the image component 222 receives, via the communication component 202, selection of one or more images to include in the video. Thus, the image component 222 may receive captured image(s) from the client device 106 or receives a selection of one or more images displayed for selection on the post generation UI. These selected images are then provided to the video component 224.

In operation 336, the video component 224 generates video by applying transitions to the selected images. In some cases, the video component 224 randomly applies transitions (e.g., zoom in, zoom out, fade in, fade out) to the selected images, for example, based on the video length and the number of selected images. In other embodiments, the video component 224 retrieves a video template from the template data storage 214, which defines the type of transitions to use and for how long each image should be displayed before a transition occurs. The video template can be selected based on, for example, the networking platform 108 that will display the post, the number of selected images, and/or preferences/defaults set by the user. In some cases, the video component 224 generates and includes an AI-generated voice-over or background music to the video.

In operation 338, the preview component 220 updates the preview of the post to include the generated video. In some embodiments, the preview component 220 formats the video to the requirements of the networking platform 108 (e.g., size or length requirements) to which the post will be published. The video is then incorporated with the generated text content and presented as a preview of the post on the post generation UI.

In operation 340, the share component 206 receives an indication to share the generated post. In example embodiments, the preview component 220 displays, via the post generation UI, a share icon or option. Upon user approval of the preview of the generated post, the user can select the share option. The indication of this selection is received by the communication component 202 and transmitted to the share component 206.

In operation 342, a determination is made whether the social media post is scheduled to be published at a later time. In some cases, the indication to share the post may trigger a request to be displayed on the post generation UI to confirm whether to immediate publish the post or to schedule the publication for a later time. In other cases, the post generation UI may display two share icons or options-one for immediate publication and one for scheduled publication.

If the social media post is to be published at a later time, then in operation 344, the scheduling component 208 receives an indication of the time. In operation 346, the share component 206 publishes the post to the corresponding networking platform 208 (e.g., upon the selection of the share option or based on the schedule time).

Figure 4A:
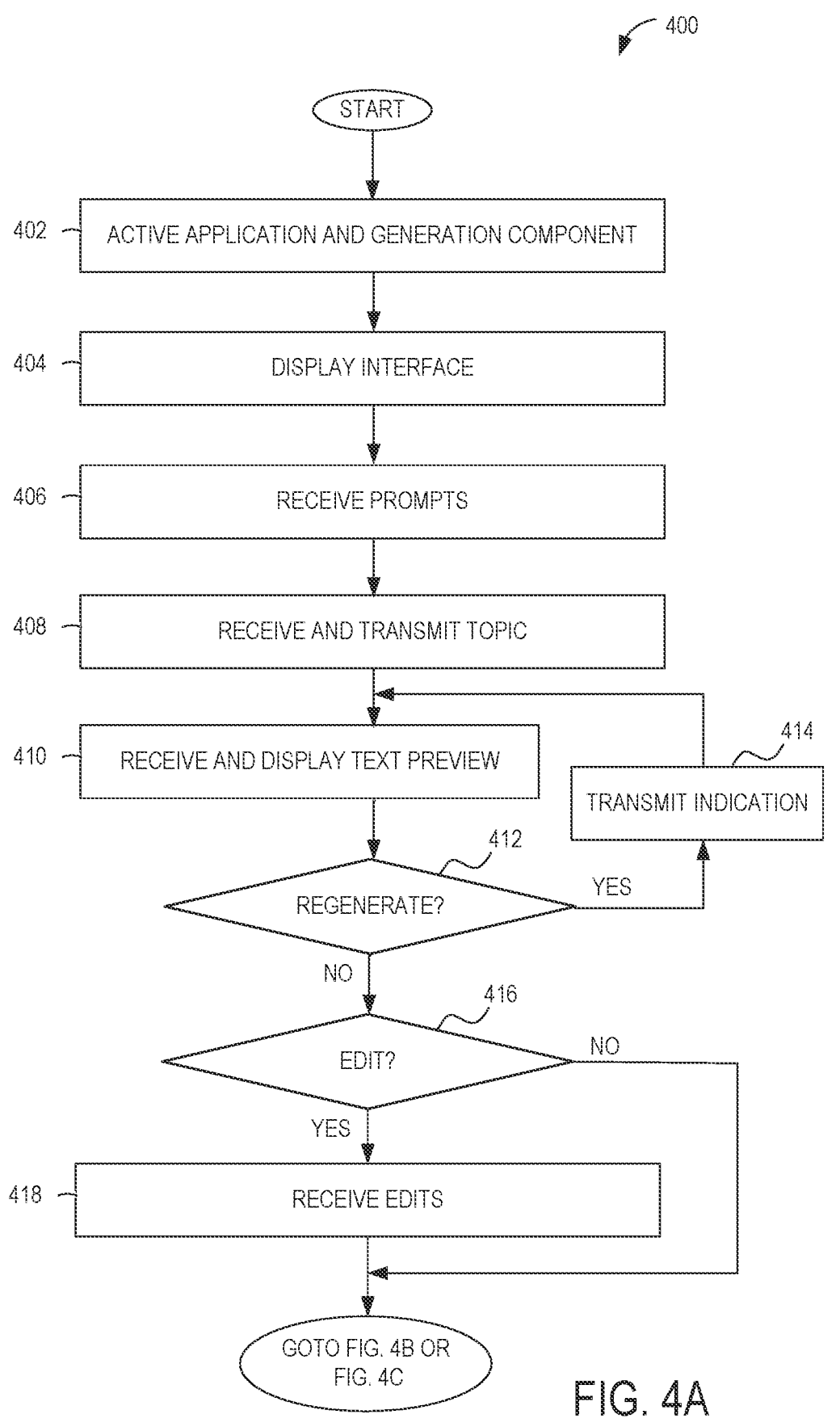
FIG. 4A-FIG. 4C are flowcharts illustrating operations of a method for generating social media posts performed by an application running on a client device, according to some example embodiments.
Figure 4B:
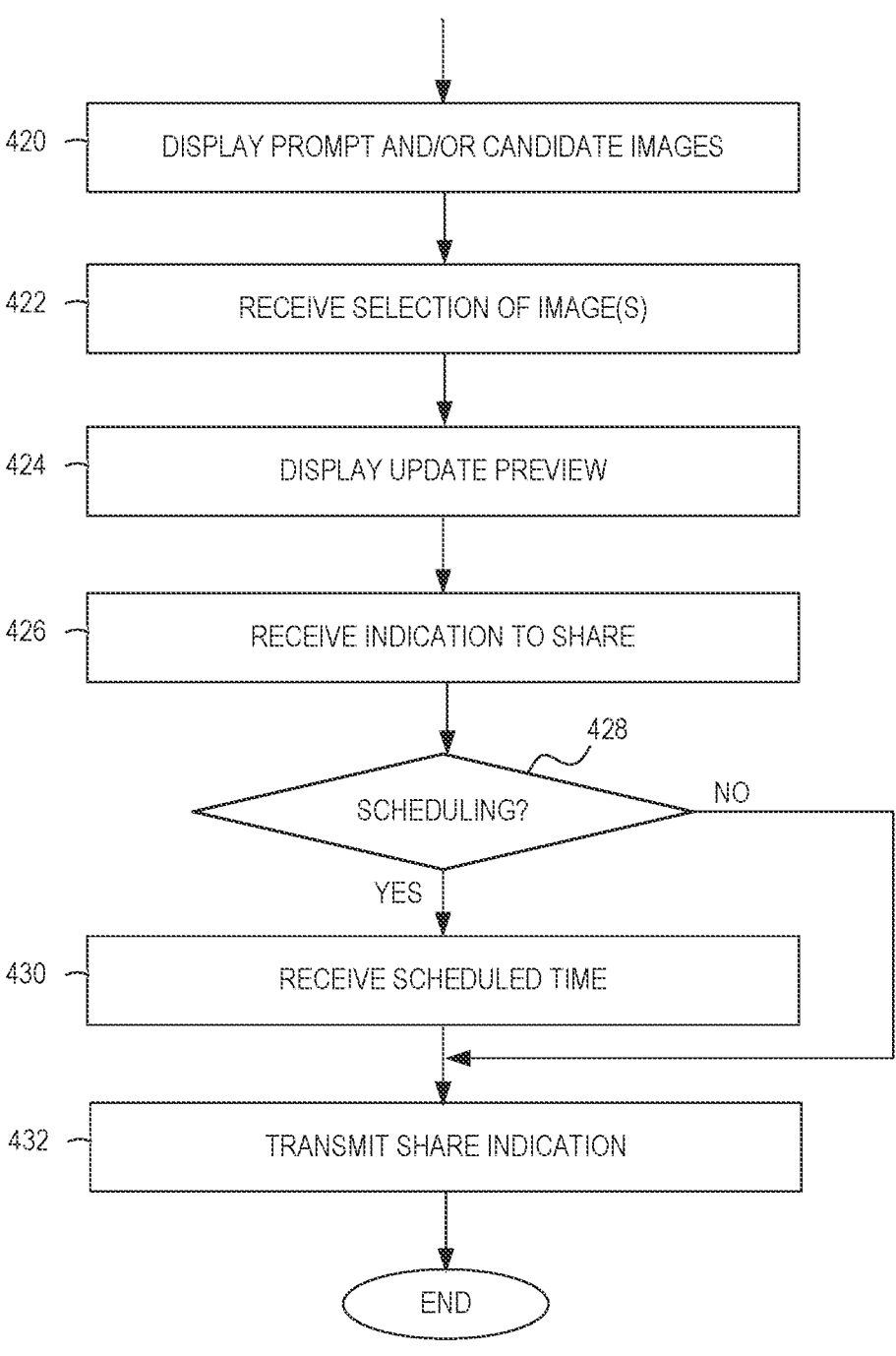
Figure 4C:
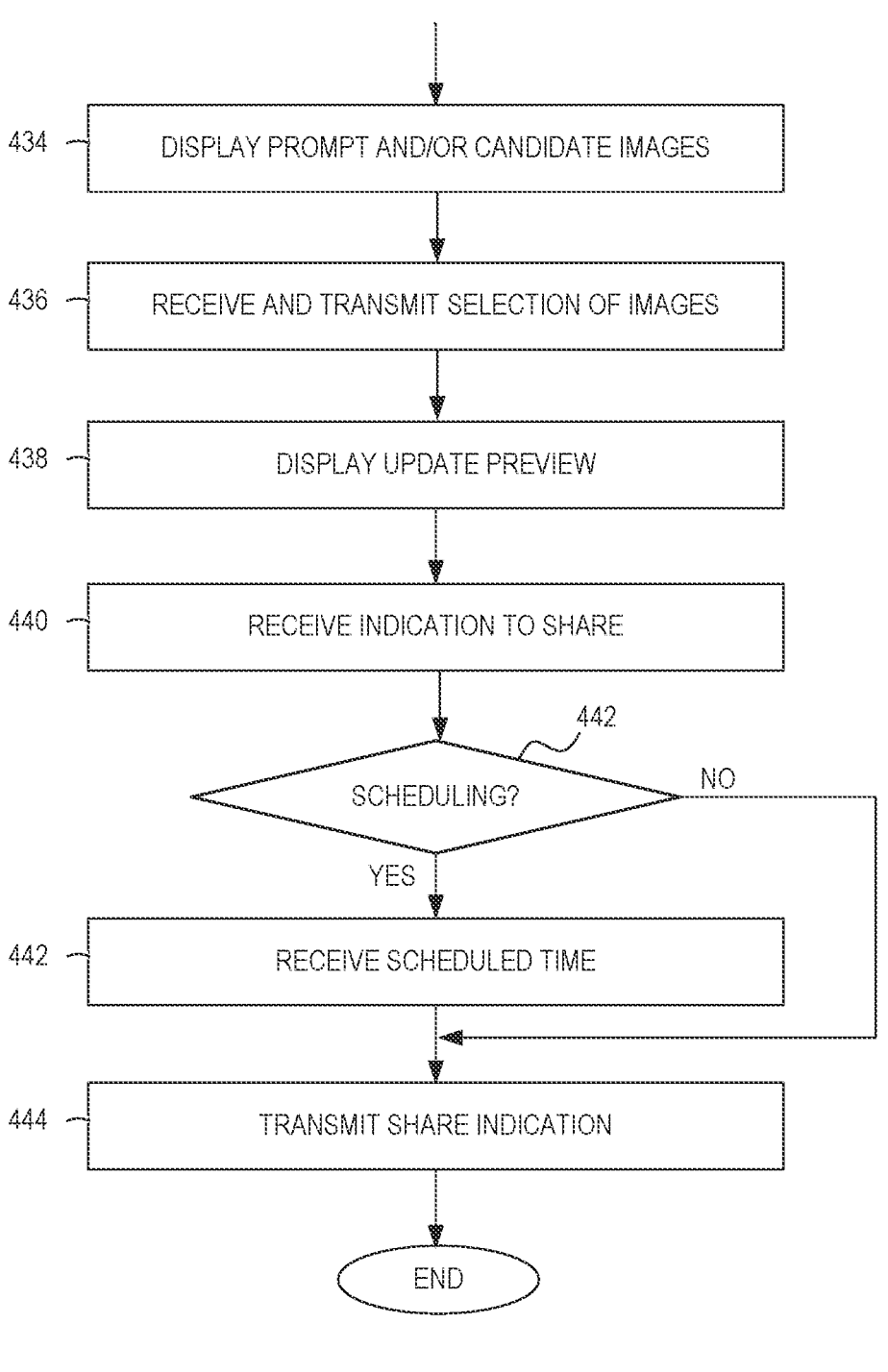

FIG. 4A-FIG. 4C are flowcharts illustrating operations, performed by the client device 106, of a method 400 for a generating social media post, according to some example embodiments. Operations in the method 400 may be performed at the client device 106 in the network environment 100 described above with respect to FIG. 1. Accordingly, the method 400 is described by way of example with reference to the client device 106 and the client application 112 operating thereon. However, it shall be appreciated that at least some of the operations of the method 400 may be deployed on various other hardware configurations or be performed by similar components residing elsewhere in the network environment 100. Therefore, the method 400 is not intended to be limited to the client device 106.

In operation 402, the client device 106 activates the client application 112 and/or the post generation component of the client application 112. For instance, a user of the client device 106 causes the client application 112 to open and selects an icon within the client application 112 that activates the post generation component. The activation of the post generation component causes a post generation UI to be displayed in operation 404.

In operation 406, the client application 112 receives custom prompts from the network system 102. In some cases, the custom prompts are displayed almost immediately upon the activation of the post generation component. The custom prompts provides suggestions of topics for a post and can be displayed on the post generation UI.

In operation 408, the client application 112 receives a topic for the post from the user. In some cases, the user may manually input a topic in a topic input field of the post generation UI. In other cases, the user can activate a microphone and verbally indicate the topic to the post generation UI. Further still, the user can select one or more of the custom prompts as the topic. In some cases, the user may indicate the networking platform 108 on which the post will be published. The topic (and the networking platform 108 if indicated) is then transmitted to the network system 102.

In operation 410, the client application 112 receives and displays the generated text content on the post generation UI. For example, the preview component 220 of the network system 102 generates the preview of the text portion of the post and transmits the preview to the client device 106 for display. The text portion may be formatted for the particular networking platform 108 that the post will be published.

In operation 412, a determination is made whether a regenerate indication is received. In some cases, the user may not like the generated text content and wants the text content regenerated. If the regenerate indication is received, then the client application 112 transmits the indication to the network system 102 in operation 414. The indication can include a refined topic. The network system 102 regenerates the text content and the method 400 returns to operation 410.

If no regenerate indication is received, the method 400 continues to operation 416 where a determination is made whether edits are made to the text content. In example embodiments, the user can select an edit option displayed on the preview of the text content. The user can then directly edit the text content displayed on the post generation UI. These edits are received in operation 418 and transmitted to the preview component 220 which will use the edits to update the text content.

If no edits are received, then the method 400 continues to either FIG. 4B or FIG. 4C. The operations of FIG. 4B involve the incorporation of one or more images into the post, while the operations of FIG. 4C involve the incorporation of one or more videos in the post. The determination of whether to incorporate an image or a video may be triggered by a selection of a corresponding option via the post generation UI. For example, the post generation UI may provide selectable icons to add image(s) or to add video(s) to the post.

Referring now to FIG. 4B, in operation 420, the client application 112 displays one or more image prompts. In some cases, the image prompt instructs the user to upload one or more relevant images to include in the post or to take a live photo. As a further image prompt, the post generation application activates a camera application (or a camera functionality associated with the post generation component) and prompts the user to capture a photo(s). In some cases, images stored on the client device 102 (e.g., identified from an image gallery on the client device 102) that may be relevant to the post may be displayed as candidate images from which the user can select from for inclusion in the post. Additionally, one or more images generated by the image component 222 or generative AI system and/or one or more relevant stock images can be displayed on the post generation UI for selection.

In operation 422, the client application 112 receives selection of one or more images to include in the post. For example, the user may select one or more images displayed on the post generation UI by tapping on the image (or image icon/thumbnail). Alternatively, the user captures and transmits one or more images to the network system 102. The indication of the selected images is transmitted to the network system 102.

In operation 424, the client application 112 receives and displays the updated preview of the post which now includes the image(s). In example embodiments, the preview component 220 updates the preview of the post to include the selected image(s) including formatting the image(s) to the requirements of the networking platform 108 to which the post will be published. The updated preview is transmitted to the client application 112, which updates the preview in the post generation UI.

In operation 426, the client application 112 receives an indication to share the generated post. In example embodiments, the post generation UI displays a share icon or option which is selectable by the user.

A determination is made whether the user wants to publish the post at a later time, in operation 428. In some cases, the indication to share the post may trigger a request to be displayed on the post generation UI to confirm whether to immediate publish the post or to schedule the publication for a later time. In other cases, the post generation UI may display two share icons or options—one for immediate publication and one for scheduled publication.

If the social media post is to be published at a later time, the client application 112 receives an indication of the time in operation 430. In some cases, the user may input or select the date and time. In other cases, the scheduling component 208 provides suggestions of when to publish the post which are displayed on the post generation UI for selection.

In operation 432, the client application 112 transmits the share indication and the scheduled time to the network system 102. In an alternative embodiment, the share indication is transmitted in operation 426 and the time is transmitted in operation 432.

Referring now to FIG. 4C, operations for generating a video and including the generated video in the social media post are provided. In the embodiment described in FIG. 4C, the video is generated by the network system 102 instead of merely transmitting a video captured by the client device 106.

In operation 434, the client application 112 displays one or more image prompts. In some cases, the image prompt instructs the user to upload one or more relevant images to include in the post or to take a live photo. As a further image prompt, the post generation application activates a camera application (or a camera functionality associated with the post generation component) and prompts the user to capture one or more photos. In some cases, relevant images stored on the client device 102 (e.g., identified from an image gallery on the client device 102) may be displayed as candidate images from which the user can select for inclusion in the post. Additionally, one or more images generated by the image component 222 or generative AI system or obtained from the image data storage 212 can be displayed on the post generation UI for selection.

In operation 436, the client application 112 receives selection of one or more images to include in the video (or an indication to transmit one or more captured images). For example, the user may select one or more images displayed on the post generation UI by tapping on the image (or image icon/thumbnail). The indication of the selected images is transmitted to the network system 102 (e.g., the video component 224).

In operation 438, the client application 112 receives and displays the updated preview of the post which now includes the video. In example embodiments, the preview component 220 updates the preview of the post to include the generated video which is properly formatted to the requirements of the networking platform 108 to which the post will be published. The updated preview is transmitted to the client application 112, which updates the preview in the post generation UI.

In operation 440, the client application 112 receives an indication to share the generated post. In example embodiments, the post generation UI displays a share icon or option which is selectable by the user.

A determination is made whether the user wants to publish the post at a later time, in operation 442. In some cases, the indication to share the post may trigger a request to be displayed on the post generation UI to confirm whether to immediate publish the post or to schedule the publication for a later time. In other cases, the post generation UI may display two share icons or options—one for immediate publication and one for scheduled publication.

If the social media post is to be published at a later time, the client application 112 receives an indication of the time in operation 442. In some cases, the user inputs or selects the date and time. In other cases, the scheduling component 208 provides suggestions of when to publish the post which are displayed on the post generation UI for selection.

In operation 444, the client application 112 transmits the share indication and the scheduled time to the network system 102. In alternative cases, the share indication is transmitted in operation 440 and the time is transmitted in operation 444.

Figure 5E:
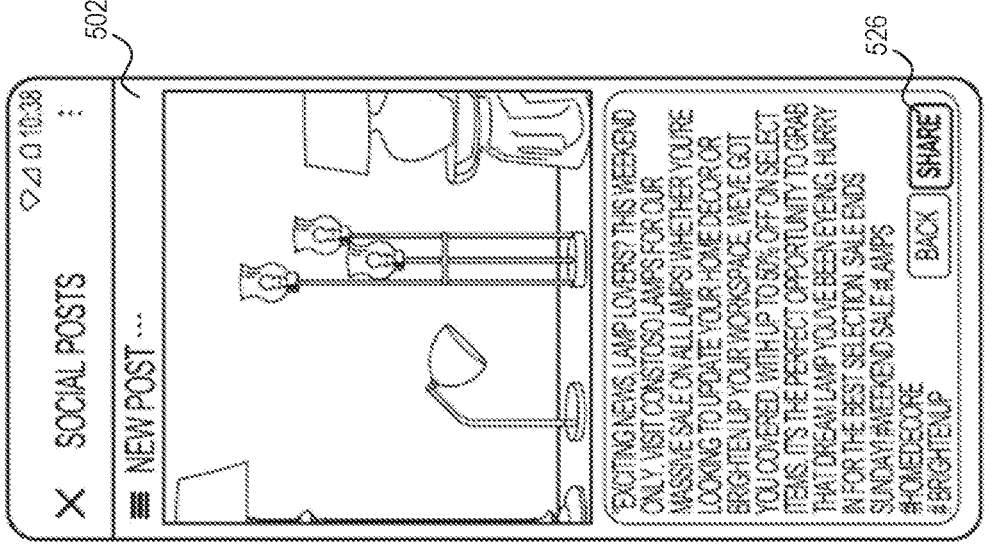

FIG. 5A-FIG. 5E are example screenshots illustrating user interfaces presented on the client device 106 (e.g., a mobile device such as a smartphone) for generating social media content, according to some example embodiments. FIG. 5A show a screenshot of a user interface whereby a productivity (client) application has been activated and components of the productivity application are shown. The components of the productivity application include for example, a Notes component, a Lens component, a Voice component, a Word component, an Excel component, a PowerPoint component, a Forms component, a To Do component, and a Social Posts component 500. The Social Posts component 500 comprises the post generation component of the productivity application.

Upon activation of the Social Post component 500, a post generation UI 502 is displayed as shown in FIG. 5B. The post generation UI 502 includes a text display section 504, a topic input section 506, and a plurality of custom prompts 508. The text display section 504 is an area of the post generation UI 502 where a preview of the generated text content is displayed.

The topic input section 506 is an area of the post generation UI 502 where the user of the client device 106 can input a topic for the post. For example, the topic can be "Write a Facebook post about weekend sale at my lamp store." The topic can be inputted by typing the topic in the topic input section 506, be provided verbally through a microphone of the client device 106 that is activated by selection of a microphone icon 510, or by selecting a custom prompt 508.

The plurality of custom prompts 508 are determined specifically for the user of the client device 106. Here, because the user is an owner of a lamp shop, the prompt component 216 generates custom prompts 508 directed to lamp subject matters. For example, the custom prompts 508 include a Promote New Item prompt, a New Sale prompt, and a Trivia About Lamps prompt. Selection of one of the custom prompts 508 causes the subject matter of the custom prompt to be added to the topic input section 506, in some embodiments. More than one custom prompt can be selected. Further still, after a custom prompt is selected, a new custom prompt can be provided in its place. The new custom prompt may be a next ranked prompt generated by the prompt component 216. Once the user approves of the topic entered in the topic input section 506, the user can select a generate option or icon 512. The selection causes the topic to be transmitted to the network system 102.

Referring now to FIG. 5C, the post generation UI 502 is updated to show a preview of the generated text content in the text display section 504. The user can select an edit icon 514 to edit the text content. For example, selection of the edit icon 514 allows the user to tap on a portion of the text that the user wants to edit and directly enter the changes. The user can also select a copy icon 516 in order to copy at least a portion of the text content. The copied portion can then be pasted elsewhere by the user.

In some cases, the user may not like the generated text content. In response, the user can select a regenerate icon 518. The selection of the regenerate icon 518 triggers the text component 218 to generate a new text portion for the post. The regenerated text content replaces the original text content in the text display section 504.

Figure 5D:
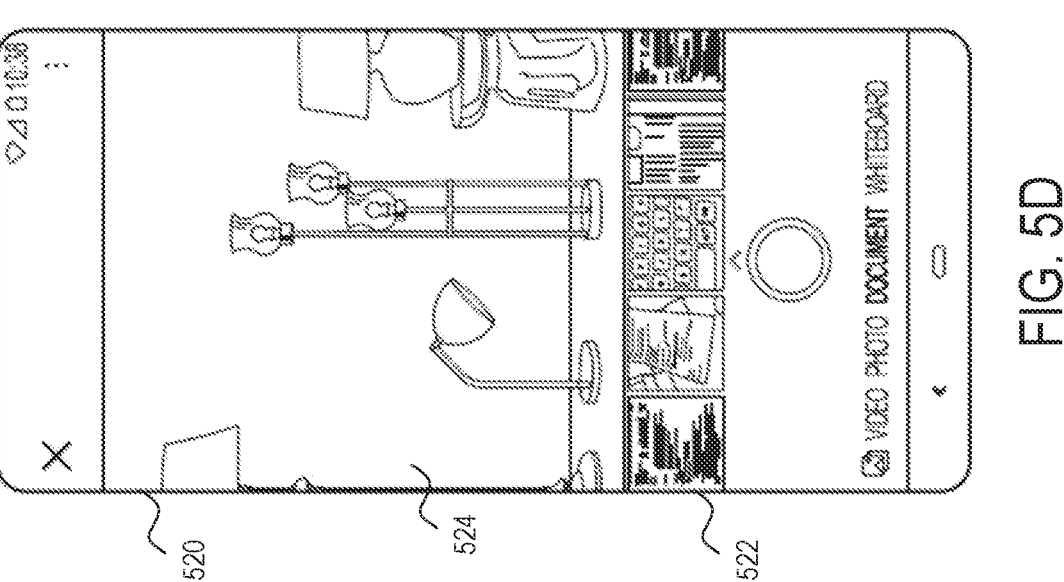

FIG. 5D shows a user interface 520 for selection of images or capturing of a new image. In some cases, the user interface 520 is associated with a camera application or functionality of the client device 106. In other cases, the user interface 520 is provided by the post generation component. The user interface 520 displays a plurality of images 522 that are selectable for inclusion in the post. The plurality of images 522 can include images accessed from a gallery stored on the client device 106. In some embodiments, the post generation component may perform a search of the gallery and only cause display of images that are relevant to the topic. For example, only images that show a lamp may be displayed. The user interface 520 also allows the capture of a live image or video that is displayed in a view section 524 of the user interface 520. In further embodiments, stock images from the network system 102 and/or generated images can be included in the plurality of images 522 for selection. While the user interface 520 is a separate user interface 520 displaying the plurality of images 522, alternatively, the plurality of images 522 can be displayed on the post generation UI 502 (e.g., under the text display section 504).

Once the user selects an image for inclusion in the post, the preview component 220 incorporates the image into the post and causes displays of the preview on the post generation UI 502. In the case of a video, the selected images are used to create the video which is then incorporated with generated text in the preview. FIG. 5E illustrates the post generation UI 502 updated to display the preview. If the user approves of the preview, the user can select a share option or icon 526 to publish (or set a time to publish) the post. In some cases, the selection of the share option may trigger a display of a "share now" option and a "schedule" option that allows the user to schedule a future time for the publication of the post. Alternatively, the "schedule" option can be displayed with the share option 526 with the share option 526 triggering immediate publication of the post.

Figure 6:
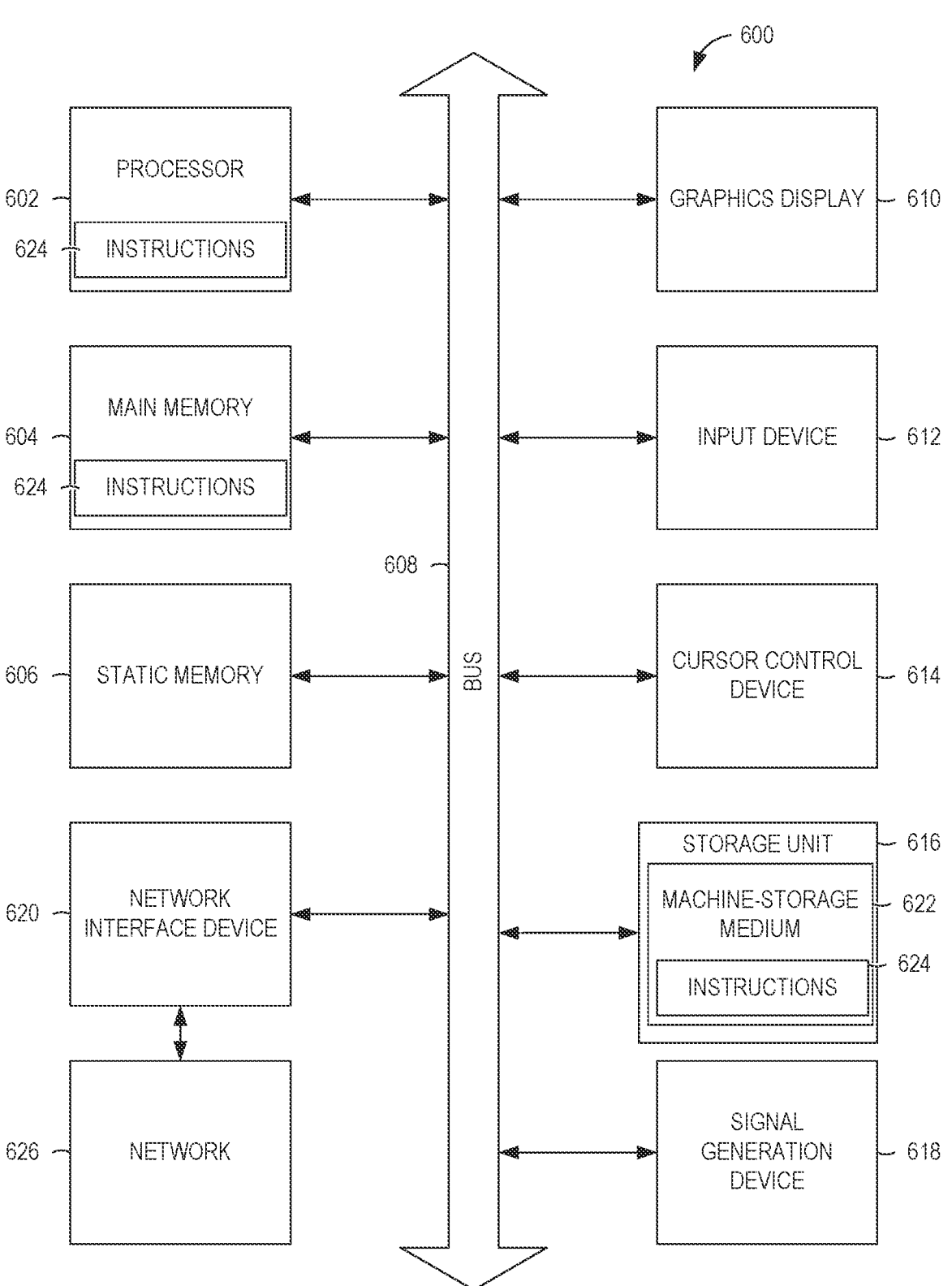
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3A to FIG. 4C. In one embodiment, the instructions 624 can transform the machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more components described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g, a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, for example, erasable programmable read-only memory (EPROM), electrically erasable programmable read-only memory (EEPROM), FPGA, and flash memory devices, magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for machine-generating media posts for publication to networking platforms. The method comprises receiving, at a network system, an indication of activation of a post generation component of a client application executing on a mobile device of a user; reviewing, via a post generation user interface (UI) implemented by the post generation component executing on the mobile device, an indication to generate a post on a topic for a networking platform; obtaining, from a generative artificial intelligence system, text for the post based on the topic and the networking platform, the obtaining being triggered by an application programming interface (API) call to the generative artificial intelligence system that includes an indication of the topic, the networking platform, and any applicable user preferences; causing display of a plurality of images; receiving a selection of one or more images of the plurality of images; using the selected one or more images, generating a video by applying transition effects to the selected one or more images and incorporating a machine-generated voice-over based on the text; causing presentation of a preview of the post including the video on the post generation UI; and in response to an indication to share the post, causing the post to be published to the networking platform.

In example 2, the subject matter of example 1 can optionally include in response to receiving the indication of the activation of the post generation component, determining custom prompts to display on the post generation UI, the custom prompts providing selectable suggestions for the topic; and causing display of a first set of the custom prompts on the post generation UI, the first set of the custom prompts displayed prior to any user input being received via the post generation UI.

In example 3, the subject matter of any of examples 1-2 can optionally include wherein determining the custom prompts comprises accessing a profile of a user using the post generation component; and based on the profile, determining one or more subject matters associated with the user; and ranking the one or more subject matters, the ranked one or more subject matters being used to generate the custom prompts.

In example 4, the subject matter of any of examples 1-3 can optionally include wherein the first set comprises a top ranked number of custom prompts, the method further comprising based on a selection of a custom prompt from the first set, causing a next ranked custom prompt not included in the first set to replace the selected custom prompt on the post generation UI.

In example 5, the subject matter of any of examples 1-4 can optionally include wherein causing display of the plurality of images comprises accessing, via the post generation component executing on the mobile device, images captured and stored on the mobile device; and identifying stored images on the mobile device that are related to the topic for display.

In example 6, the subject matter of any of examples 1-5 can optionally include wherein causing display of the plurality of images comprises triggering the post generation component to interact with a camera application on the mobile device to capture a live image and display the captured live image.

In example 7, the subject matter of any of examples 1-6 can optionally include wherein causing display of the plurality of images comprises generating, using an image generation application, an image based on the topic.

In example 8, the subject matter of any of examples 1-7 can optionally include wherein generating the video comprises accessing a video template based on the networking platform or a number of selected images, wherein the transition effects are defined by the template.

In example 9, the subject matter of any of examples 1-8 can optionally include receiving an indication of a time to share the post; and scheduling the post to be published to the networking platform at the indicated time.

In example 10, the subject matter of any of examples 1-9 can optionally include accessing machine-learned data indicating suggested times to share the post; and causing display of one or more suggested times to share the post from which the indication of time is selected.

In example 11, the subject matter of any of examples 1-10 can optionally include wherein incorporating the machine-generated voice-over comprises generating speech based on the text for the post; and incorporating the speech as the voice-over to the video.

In example 12, the subject matter of any of examples 1-11 can optionally include wherein obtaining the text comprises generating by, the generative artificial intelligence system, the text for the post.

In example 13, the subject matter of any of examples 1-12 can optionally include wherein obtaining the text comprises making an application programming interface (API) call to the generative artificial intelligence system.

Example 14 is a system for machine-generating media posts for publication to networking platforms. The system comprises one or more processors and a memory storing instructions that, when executed by the one or more processors, cause the one or more hardware processors to perform operations comprising receiving an indication of activation of a post generation component of a client application executing on a mobile device of a user; receiving, via a post generation user interface (UI) implemented by the post generation component executing on the mobile device, an indication to generate a post on a topic for a networking platform; obtaining, from a generative artificial intelligence system, text for the post based on the topic and the networking platform, the obtaining being triggered by an application programming interface (API) call to the generative artificial intelligence system that includes an indication of the topic, the networking platform, and any applicable user preferences; causing display of a plurality of images; receiving a selection of one or more images of the plurality of images; using the selected one or more images, generating a video by applying transition effects to the selected one or more images and incorporating a machine-generated voice-over based on the text; causing presentation of a preview of the post including the video on the post generation UI; and in response to an indication to share the post, causing the post to be published to the networking platform.

In example 15, the subject matter of example 14 can optionally include wherein the operations further comprise in response to receiving the indication of the activation of the post generation component, determining custom prompts to display on the post generation UI, the custom prompts providing selectable suggestions for the topic; and causing display of a first set of the custom prompts on the post generation UI, the first set of the custom prompts displayed prior to any user input being received via the post generation UI.

In example 16, the subject matter of any of examples 13-15 can optionally include wherein causing display of the plurality of images comprises triggering the post generation component to interact with a camera application on the mobile device to capture a live image and display the captured live image.

In example 17, the subject matter of any of examples 13-16 can optionally include wherein generating the video comprises accessing a video template based on the networking platform or a number of selected images, wherein the transition effects are defined by the template.

In example 18, the subject matter of any of examples 13-17 can optionally include wherein the operations further comprise receiving an indication of a time to share the post; and scheduling the post to be published to the networking platform at the indicated time.

In example 19, the subject matter of any of examples 13-18 can optionally include wherein the operations further comprise accessing machine-learned data indicating suggested times to share the post; and causing display of one or more suggested times to share the post from which the indication of time is selected.

Example 20 is a storage medium comprising instructions which, when executed by one or more processors of a machine, cause the machine to perform operations for machine-generating media posts for publication to networking platforms. The operations comprise receiving an indication of activation of a post generation component of a client application executing on a mobile device of a user; receiving, via a post generation user interface (UI) implemented by the post generation component executing on the mobile device, an indication to generate a post on a topic for a networking platform; obtaining, from a generative artificial intelligence system, text for the post based on the topic and the networking platform, the obtaining being triggered by an application programming interface (API) call to the generative artificial intelligence system that includes an indication of the topic, the networking platform, and any applicable user preferences; causing display of a plurality of images; receiving a selection of one or more images of the plurality of images; using the selected one or more images, generating a video by applying transition effects to the selected one or more images and incorporating a machine-generated voice-over based on the text; causing presentation of a preview of the post including the video on the post generation UI; and in response to an indication to share the post, causing the post to be published to the networking platform.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for machine-generating posts that are formatted differently for different networking platforms based on corresponding posting requirements, the method comprising:

receiving, via a post generation user interface (UI) implemented by a post generation component executing on a mobile device of a user, an indication to generate a post on a topic for a networking platform of the different networking platforms;

obtaining, from a generative artificial intelligence system, text for the post tailored to the networking platform, the obtaining being triggered by an application programming interface (API) call to the generative artificial intelligence system, the API call including an indication of the topic, an indication of the networking platform, and any applicable user preferences, the generative artificial intelligence system customizing the text based on the topic, the user preferences, and posting requirements of the networking platform;

causing display of a plurality of images associated with the topic;

receiving a selection of one or more images of the plurality of images;

using the selected one or more images, generating, by a video component, a video, the generating comprising:

selecting a video template based on the networking platform and a number of the selected one or more images;

retrieving, from a database of video templates, the selected video template associated with the networking platform, the selected video template comprising instructions for generating the video including an amount of time to display each image of the one or more images before an image transition and a transition effect to apply at each image transition between the one or more images; and applying the amount of time to display each image and the transition effect to each image transition;

generating, by a preview component, a preview of the post by formatting a size and length of the video based on the posting requirements of the networking platform and incorporating the formatted video with the text, the posting requirements including a size requirement, a pixel requirement, and a length requirement specific to the networking platform, the formatting producing a video that complies with the posting requirements without requiring manual post-processing;

causing presentation of the preview of the post on the post generation UI; and in response to an indication to share the post, causing the post to be published to the networking platform.

2. The method of claim 1, further comprising:

receiving an indication of activation of the post generation component;

in response to receiving the indication of the activation of the post generation component, determining custom prompts to display on the post generation UI, the custom prompts providing selectable suggestions for the topic; and causing display of a first set of the custom prompts on the post generation UI, the first set of the custom prompts displayed prior to any user input being received via the post generation UI.

3. The method of claim 2, wherein determining the custom prompts comprises:

accessing a profile of a user using the post generation component;

based on the profile, determining one or more subject matters associated with the user; and ranking the one or more subject matters, the ranked one or more subject matters being used to generate the custom prompts.

4. The method of claim 2, wherein the first set comprises a top ranked number of custom prompts, the method further comprising:

based on a selection of a custom prompt from the first set, causing a next ranked custom prompt not included in the first set to replace the selected custom prompt on the post generation UI.

5. The method of claim 1, wherein causing display of the plurality of images comprises:

accessing, via the post generation component executing on the mobile device, images captured and stored on the mobile device; and identifying stored images on the mobile device that are related to the topic for display.

6. The method of claim 1, wherein causing display of the plurality of images comprises:

triggering the post generation component to interact with a camera application on the mobile device to capture a live image and display the captured live image.

7. The method of claim 1, wherein causing display of the plurality of images comprises generating, by an image generation application or a generative artificial intelligence system, an image based on the topic.

8. The method of claim 1, further comprising:

receiving an indication of a time to share the post; and scheduling the post to be published to the networking platform at the indicated time.

9. The method of claim 8, further comprising:

accessing machine-learned data indicating suggested times to share the post; and causing display of one or more suggested times to share the post from which the indication of time is selected.

10. The method of claim 1, further comprising incorporating a machine-generated voice-over based on the text, the incorporating the machine-generated voice-over comprising:

generating speech based on the text for the post; and incorporating the speech as the voice-over to the video.

11. The method of claim 1, wherein the transition effect is selected from a set including zoom in, zoom out, fade in, fade out, and morph effects to apply at each image transition between the one or more images.

12. A system comprising:

one or more processors; and a memory storing instructions that, when executed by the one or more processors, cause the one or more processors to perform operations for machine-generating posts that are formatted differently for different networking platforms based on corresponding posting requirements, the operations comprising:

receiving, via a post generation user interface (UI) implemented by a post generation component executing on a mobile device of a user, an indication to generate a post on a topic for a networking platform of the different networking platforms;

obtaining, from a generative artificial intelligence system, text for the post tailored to the networking platform, the obtaining being triggered by an application programming interface (API) call to the generative artificial intelligence system, the API call including an indication of the topic, an indication of the networking platform, and any applicable user preferences, the generative artificial intelligence system customizing the text based on the topic, the user preferences, and posting requirements of the networking platform;

causing display of a plurality of images associated with the topic;

receiving a selection of one or more images of the plurality of images;

using the selected one or more images, generating a video the generating comprising:

selecting a video template based on the networking platform and a number of the selected one or more images;

retrieving, from a database of video templates, the selected video template associated with the networking platform, the selected video template comprising instructions for generating the video including an amount of time to display each image of the one or more images before an image transition and a transition effect to apply at each image transition between the one or more images; and applying the amount of time to display each image and the transition effect to each image transition to generate the video;

generating, by a preview component, a preview of the post by formatting a size and length of the video based on the posting requirements of the networking platform and incorporating the formatted video with the text, the posting requirements including a size requirement, a pixel requirement, and a length requirement specific to the networking platform, the formatting producing the formatted video that complies with the posting requirements without requiring manual post-processing;

causing presentation of the preview of the post on the post generation UI; and in response to an indication to share the post, causing the post to be published to the networking platform.

13. The system of claim 12, wherein the operations further comprise:

receiving an indication of activation of the post generation component;

in response to receiving the indication of the activation of the post generation component, determining custom prompts to display on the post generation UI, the custom prompts providing selectable suggestions for the topic; and causing display of a first set of the custom prompts on the post generation UI, the first set of the custom prompts displayed prior to any use input being received via the post generation UI.

14. The system of claim 12, wherein causing display of the plurality of images comprises:

triggering the post generation component to interact with a camera application on the mobile device to capture a live image and display the captured live image.

15. The system of claim 12, wherein the operations further comprise:

receiving an indication of a time to share the post; and scheduling the post to be published to the networking platform at the indicated time.

16. The system of claim 15, wherein the operations further comprise:

accessing machine-learned data indicating suggested times to share the post; and causing display of one or more suggested times to share the post from which the indication of time is selected.

17. A machine-storage medium comprising instructions which, when executed by one or more processors of a machine, cause the machine to perform operations for machine-generating posts that are formatted differently for different networking platforms based on corresponding posting requirements, the operations comprising:

receiving, via a post generation user interface (UI) implemented by a post generation component executing on a mobile device of a user, an indication to generate a post on a topic for a networking platform of the different networking platforms;

obtaining, from a generative artificial intelligence system, text for the post tailored to the networking platform, the obtaining being triggered by an application programming interface (API) call to the generative artificial intelligence system, the API call including an indication of the topic, an indication of the networking platform, and any applicable user preferences, the generative artificial intelligence system customizing the text based on the topic, the user preferences, and posting requirements of the networking platform;

causing display of a plurality of images associated with the topic;

receiving a selection of one or more images of the plurality of images;

using the selected one or more images, generating a video, the generating comprising:

selecting a video template based on the networking platform and a number of the selected one or more images;

retrieving, from a database of video templates, the selected video template associated with the networking platform, the selected video template comprising instructions for generating the video including an amount of time to display each image of the one or more images before an image transition and a transition effect to apply at each image transition between the one or more images; and applying the amount of time to display each image and the transition effect to each image transition to generate the video;

generating, by a preview component, a preview of the post by formatting a size and length of the video based on the posting requirements of the networking platform and incorporating the formatted video with the text, the posting requirements including a size requirement, a pixel requirement, and a length requirement specific to the networking platform, the formatting producing the formatted video that complies with the posting requirements without requiring manual post-processing;

causing presentation of the preview of the post on the post generation UI; and in response to an indication to share the post, causing the post to be published to the networking platform.

* * * * *